H. POTH.
MEANS FOR OPERATING ELECTROMAGNETIC RECIPROCATING TOOLS WITH PULSATING DIRECT CURRENT.
APPLICATION FILED JULY 25, 1919.
1,407,804.
Patented Feb. 28, 1922.
8 SHEETS—SHEET 1.
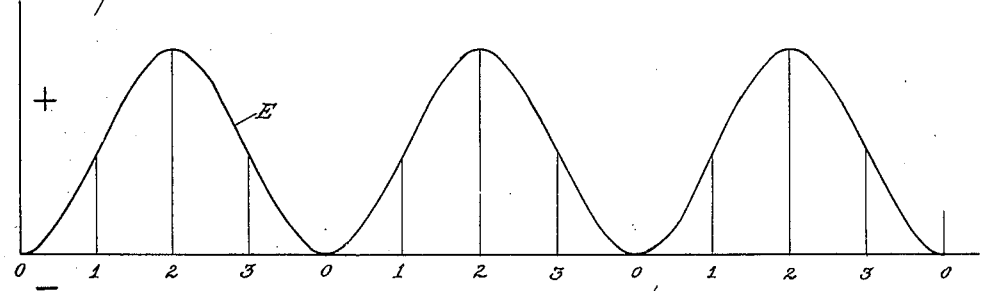
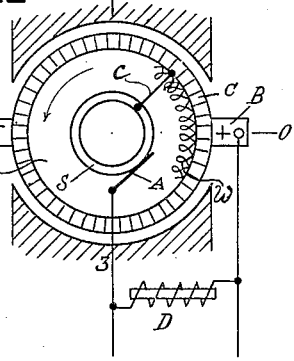
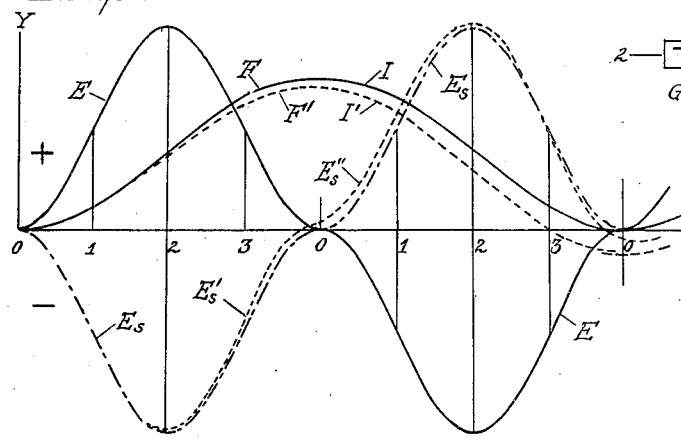
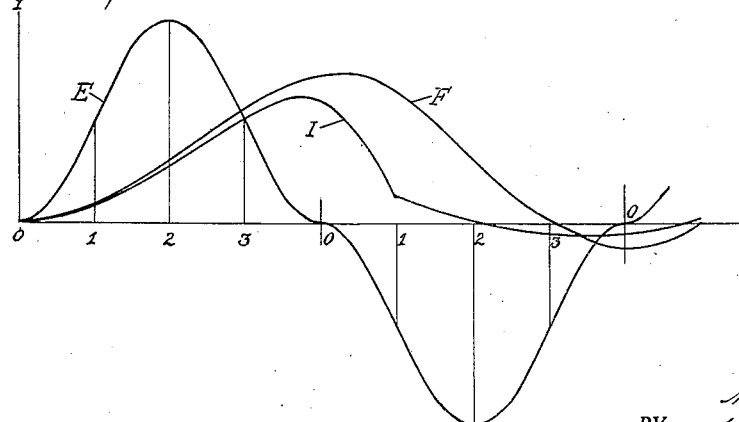
INVENTOR:
Henry Poth
BY
ATTORNEYS.

H. POTH.
MEANS FOR OPERATING ELECTROMAGNETIC RECIPROCATING TOOLS WITH PULSATING DIRECT CURRENT.
APPLICATION FILED JULY 25, 1919.

1,407,804.

Patented Feb. 28, 1922.

INVENTOR.
Henry Poth
BY
ATTORNEYS.

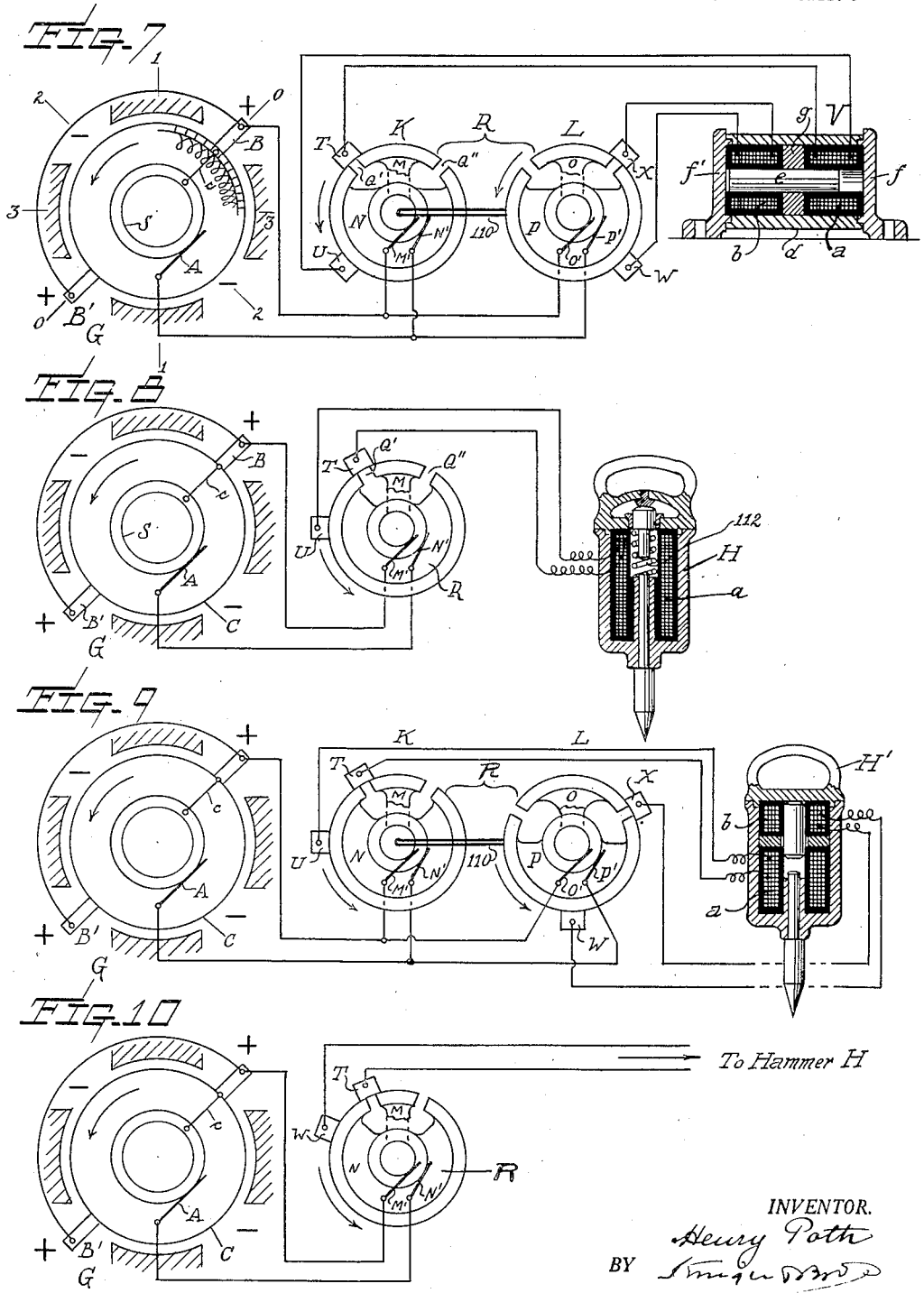

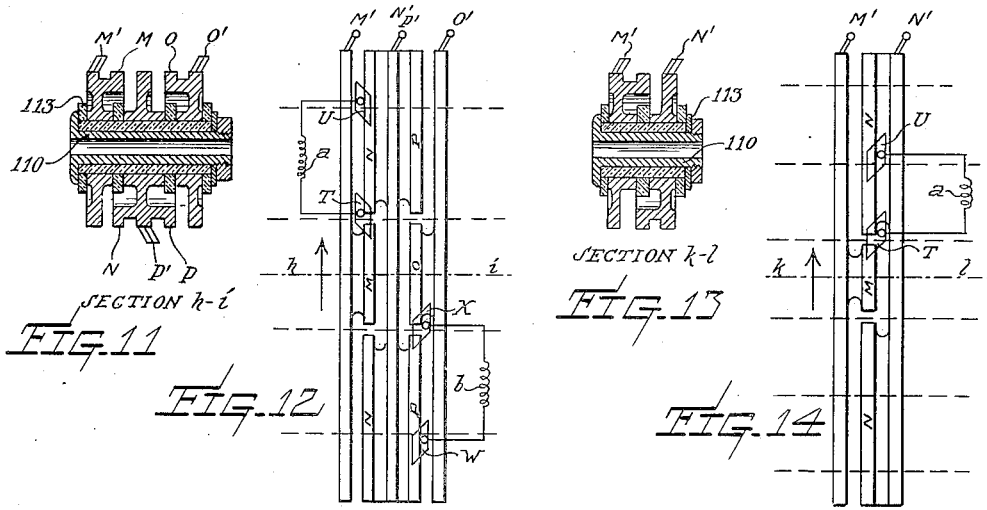
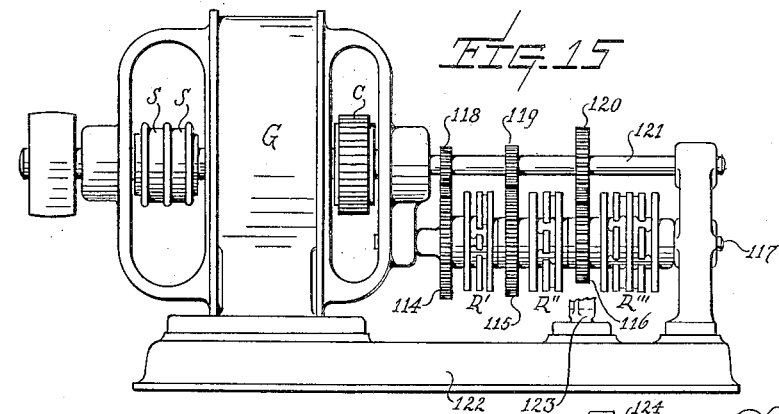
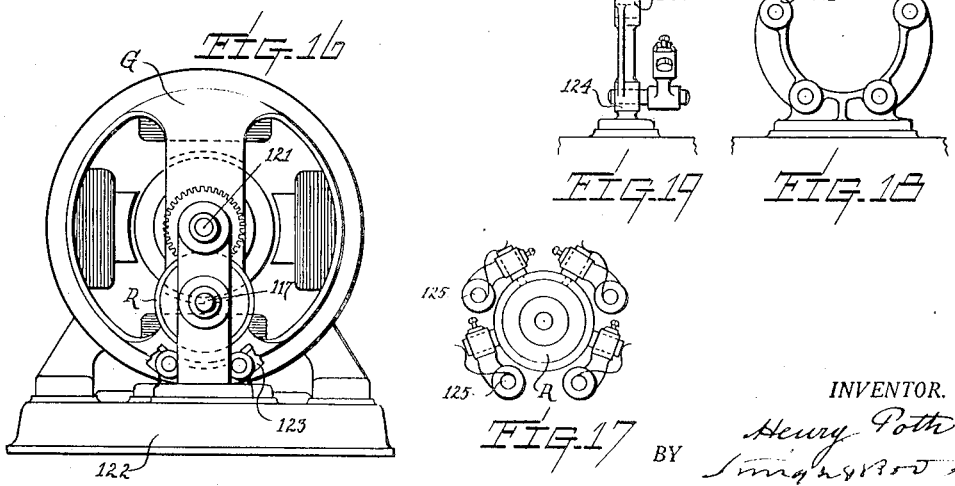

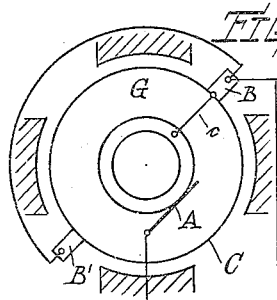
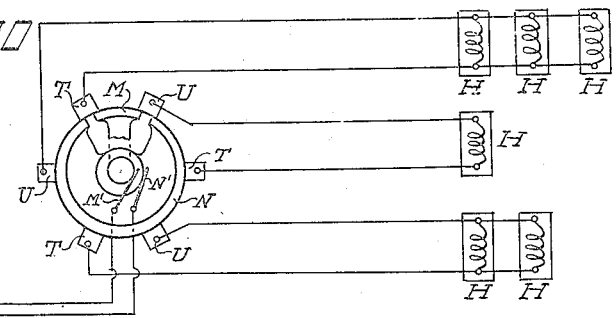
Fig. 20
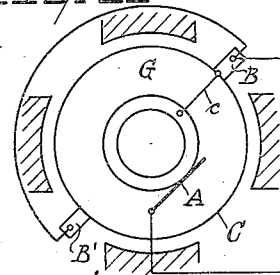
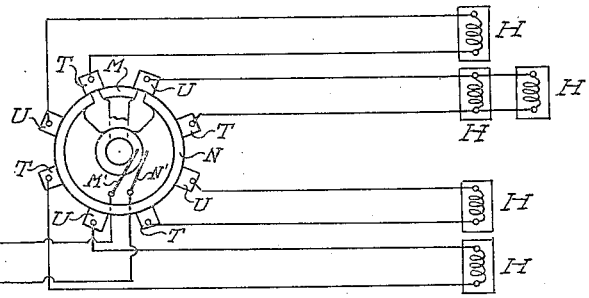
Fig. 21
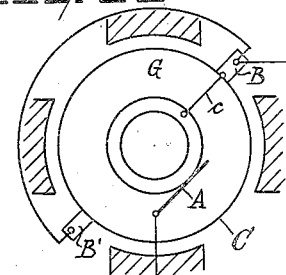
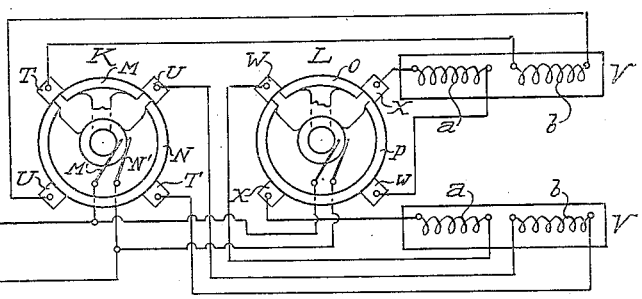
Fig. 22
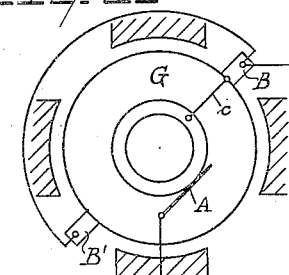
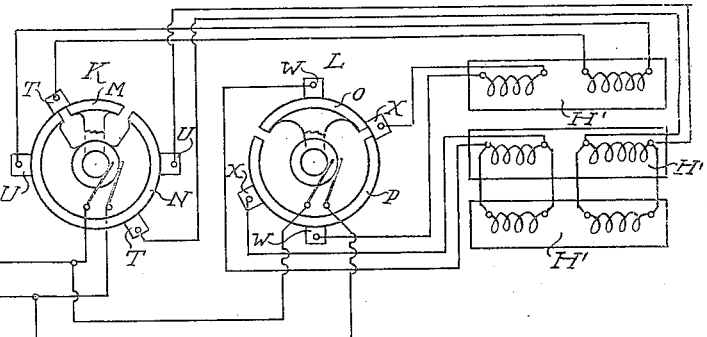
Fig. 23

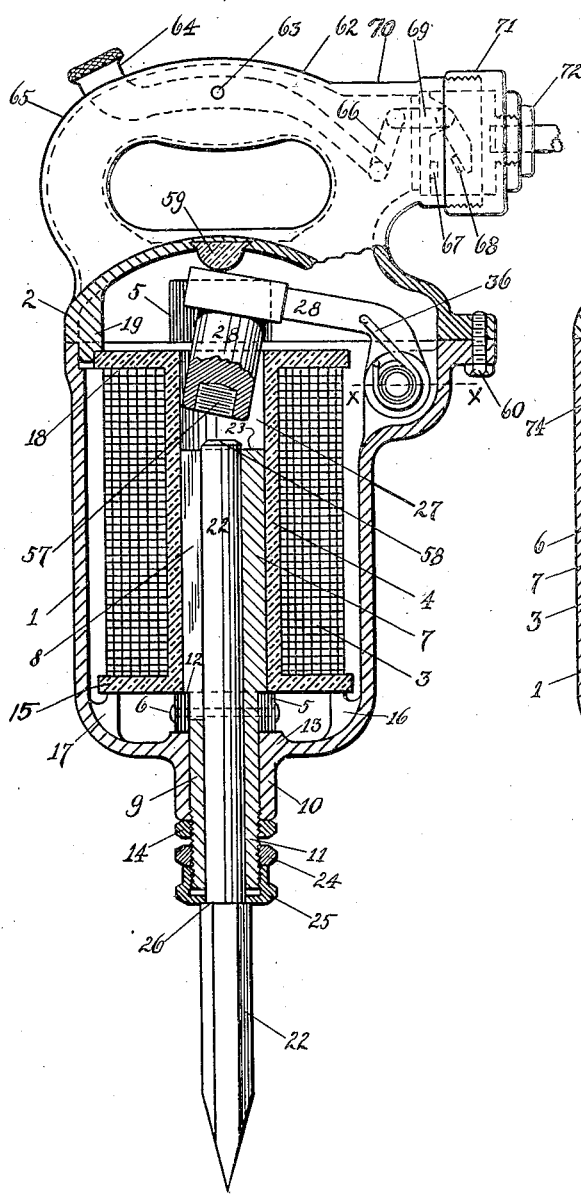

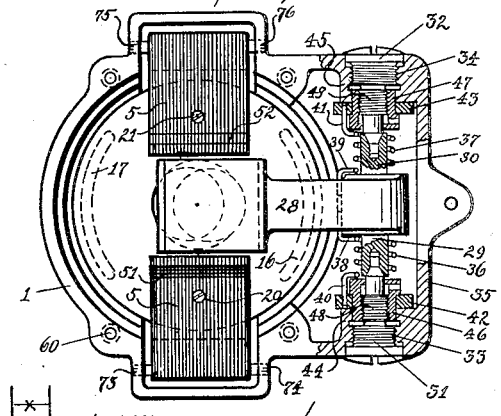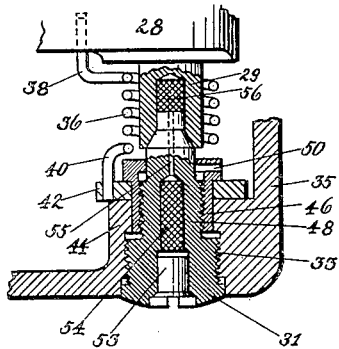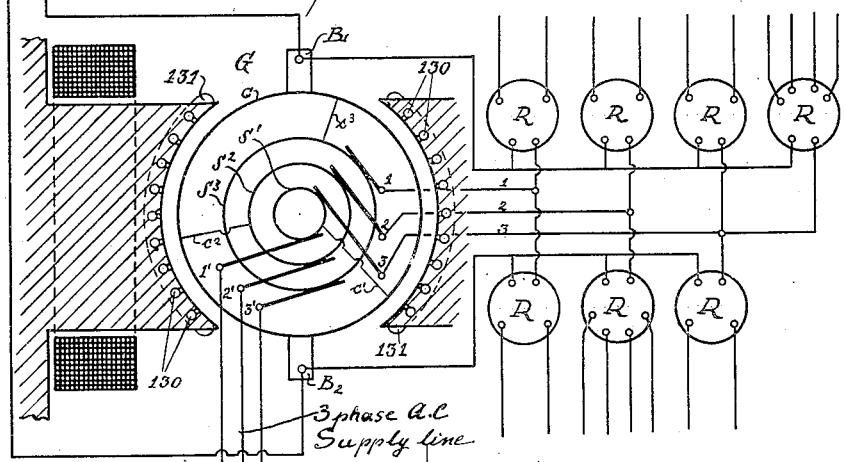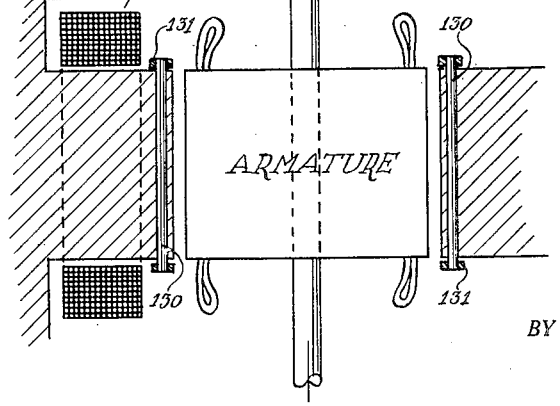

H. POTH.
MEANS FOR OPERATING ELECTROMAGNETIC RECIPROCATING TOOLS WITH PULSATING DIRECT CURRENT.
APPLICATION FILED JULY 25, 1919.
1,407,804.
Patented Feb. 28, 1922.
8 SHEETS—SHEET 8.
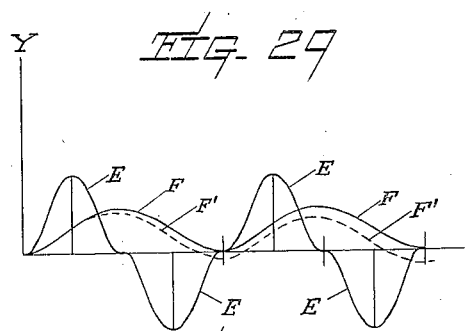
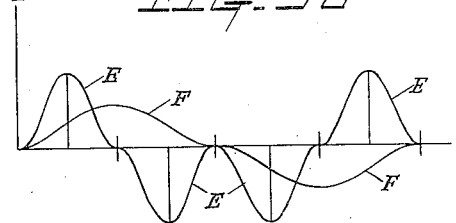
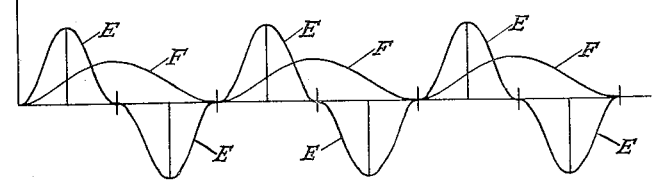
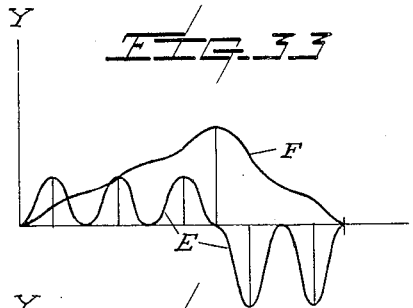
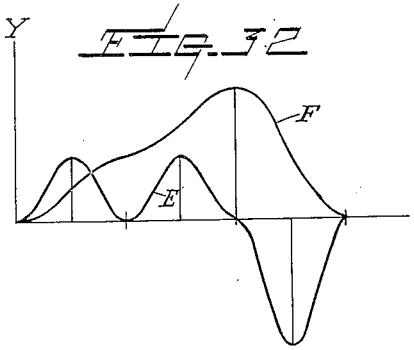
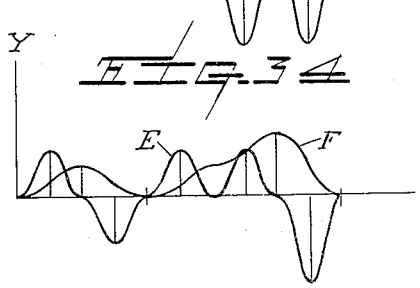
INVENTOR.
Henry Poth
BY
ATTORNEYS.

UNITED STATES PATENT OFFICE.

HENRY POTH, OF CINCINNATI, OHIO.

MEANS FOR OPERATING ELECTROMAGNETIC RECIPROCATING TOOLS WITH PULSATING DIRECT CURRENT.

1,407,804. Specification of Letters Patent. Patented Feb. 28, 1922.

Application filed July 25, 1919. Serial No. 313,344.

*To all whom it may concern:*

Be it known that I, HENRY POTH, a citizen of Germany, and a resident of Cincinnati, county of Hamilton, and State of Ohio, have invented a new and useful Means for Operating Electromagnetic Reciprocating Tools with Pulsating Direct Current, of which the following is a full and clear specification, various applications for different purposes being illustrated in the accompanying drawings and explained hereinafter.

The particular novel features of my invention are more fully pointed out in the annexed claims.

My invention relates to a new manner of operating electromagnetic striking tools by means of pulsating direct current, and it is adaptable for instance to vibrators for foundry use and to tools which are used for hammering purposes such as chiseling, chipping, calking, riveting or drilling by means of a chisel or similar tool, rivet setting and all like purposes for which a striking member of the tool imparts its blows to an operating member. In the annexed claims the term "electromagnetic reciprocating mechanism" is intended to broadly include the entire class or classes of tools of the character above stated.

The main object of the present invention is to provide a simple, efficient, reliable and universal method and apparatus or machine for the operation of this class of tools, characterized in particular by the feature that not only a number of these various tools may be operated all at the same time from the same machine, but that at the same time and from the same machine tools may be operated with different striking frequencies, that is to say tools of different numbers of blows per time unit, or in other words, tools for heavy and light work. Tools for heavy work naturally have a smaller number of blows per time unit than those for light work. This feature, which is embodied in air tools of this character, is to my knowledge not present in this class of electrical tools known to the prior art. My present improvement constitutes an advantage and improvement in this direction which increases the general utility of these tools.

Another object of my invention is to provide an equipment, or more particularly, a machine which is not dependent on any particular source of prime power. The means for generating the pulsating direct current, that is the source of energy furnishing the pulsating direct current or, more precisely, a pulsating uni-directional electromotive force whose magnitude varies between zero and a certain maximum, may be operated as well by belt drive from any source of power, as it may be operated directly from any direct or alternating current supply line.

A further object of my invention is to provide a system which allows of building the tool itself as a self-contained unit and of handling it as such, thus affording a light, simple and durable tool and at the same time affording under any and all circumstances an absolutely safe and sparkless operation. This is made possible, because the circuit including the windings of the tool proper is at no time actually opened or interrupted, the proper directing and changing of the current supplied to the windings of the tool being brought about entirely automatically in and by the apparatus supplying the impulses as will be explained later. Condensers, electrolytic valve cells, safety resistances and the like used in the prior art for the purpose of suppressing sparks are thus entirely unnecessary.

While in electromagnetic tools of similar character which are operated with alternating current or with both, alternating and direct current, the striking frequency is dependent on the frequency of the alternating current, the new system uses pulsating direct current and effects a variation of the striking frequency by admitting to different tools different numbers of uni-directional impulses, thus producing different time intervals for the working strokes. Provisions are also made for the demagnetization of the core of the tool and for sufficient time for the return of the striking element, which also may be varied.

Other features of advantage and utility in the new method will be apparent from the description.

In the drawings:

Figure 1 is a diagrammatic illustration showing how a direct current generator may be arranged to generate a pulsating uni-directional E. M. F.;

Figures 2 to 6 are diagrams illustrating the electric and magnetic conditions in an electromagnetic striking tool which will be explained hereafter;

Figure 7 shows a system representing diagrammatically a generator, a positively driven reverser and a tool, in this case a vibrator;

Figure 8 shows a system representing a modification of the reverser for the operation of what is commonly termed a "solenoid hammer", whereby the return of the striking member is effected by a spring;

Figure 9 shows a system representing a modification of the reverser for a similar tool having the same striking frequency as that of Figure 8, the return of the striking member being effected by a second coil in the tool;

Figure 10 shows a system having another reverser for a tool similar to that in Figure 8, however, for a different striking frequency;

Figures 11 and 12 show a sectional and a developed view respectively of the reverser shown in Figure 7 as it may be constructed for practical purposes;

Figures 13 and 14 show correspondingly similar views of the reverser shown in Figure 8;

Figures 15 and 16 show views of a belt driven generator with several reversers mounted on the same base plate as it may be done for practical purposes;

Figures 17 and 19 show in a general way arrangements of brushes and brush holder supports;

Figures 20 to 24 show systems similar to those in Figures 7 to 10 to be explained later;

Figure 24:
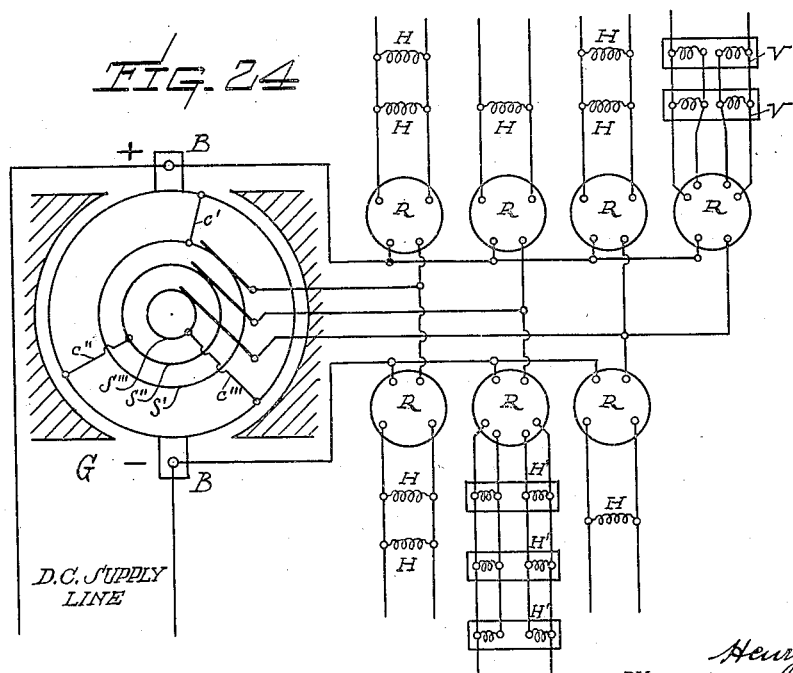

Figure 24$^a$ shows diagrammatically a modification employing a three phase alternating current converter;

Figure 24$^b$ shows diagrammatically a horizontal transverse section through the converter shown in Figure 24$^a$;

Figures 25 and 26 are vertical sectional views at right angles to each other of a practical design of a chipping and riveting hammer;

Figure 27 is a top view of such hammer showing the inside after the cover is removed, certain portions appearing in section;

Figure 28 is a partial section, on line $x$—$x$ Figure 25, of one of the hammer pivots on an enlarged scale;

Figures 29–34 are curves, similar to those of Figures 3 to 6, but showing a modified form of using the pulsating uni-directional electro-motive force.

In order to properly understand the principle of operation of my novel system I refer now to Figure 1. The pulsating direct current or rather the pulsating uni-directional E. M. F. is preferably—though not necessarily—obtained from a direct current generator G provided with a slip ring S, which may be connected to any point of the armature winding W or to any bar of commutator C by a connector $c$. Then we obtain between any main brush B and this slip ring a pulsating E. M. F. of the same polarity at any instant during one revolution (this is also true for multipolar machines), whose magnitude, however, varies between zero and a certain maximum, as illustrated by the curve E in Figure 2, the instantaneous values depending on the instantaneous location of the connector $c$, or more precisely, depending upon its momentary circumferential distance from the brush B, as will be readily understood.

If now between S and B an inductive device D is inserted and this circuit is closed at the instant when connector $c$ or the bar, to which connector $c$ is attached is right under brush B, and if this circuit remains closed for the interval of one complete pulsation (that is for one complete revolution of the armature in case of a two pole machine as Figure 1 shows), then the current flowing through D will build up a magnetic field whose instantaneous values are determined by the shape of the curve which the impressed E. M. F. assumes, which values can be expressed by the equation: $E = \text{const.} \times \frac{dF}{dt}$ ($E$ = instantaneous values of E. M. F., $F$ = flux), according to which the rising portion of the flux curve must have the shape of curve F in Figure 3. Evidently the flux increasing from zero must reach its maximum after the impressed E. M. F. has again decreased to zero, that is after connector $c$ has again arrived exactly under brush B, i. e. after one complete revolution.

In case of device D being an electromagnetic tool of the kind herein described, the striker of the tool will after the magnetic field is built up to a certain value, be attracted by the stationary core and perform its working stroke. After the completion of this stroke, the magnetic field, of course, should be removed from the tool, in order to allow the striker to return to its off position, which movement may be effected either by a spring as shown in Figures 8 and 27, or by an additional coil as shown in Figure 9. Now the same equation which allows us to determine the shape of the rising portion of the flux curve tells us that, if we apply to the device D the same E. M. F. but in opposite direction, that is with the terminals of D reversed, the total flux will decrease and be diminished again to zero in exactly the same way as it rose before from zero to maximum, the reversing of the terminals of D being done with a reverser while connector c is exactly under brush B as will be explained later on. Both portions of curve F are shown in Figure 3.

Curve F, of course, may at the same time represent the exciting current I, since the field is built up by the current; we simply assume that field and current stand in a certain relation to one another, neglecting thereby the influence of the saturation of the magnetic circuit.

That the performance of the flux curve F under the conditions illustrated (that is by impressing upon D first an E. M. F. in one direction and then one in the opposite direction) must be as indicated, will be clear from the fact that the E. M. F. curve of the self-induction will follow the line $E_s$ according to $E_s = L \times \frac{dI}{dt}$, where L = coefficient of self-induction and since the self-induction E. M. F. $E_s$ is balanced by the impressed E. M. F. E, the second wave of E really must be negative in order to maintain the state of electric equilibrium, which indeed prevails as we can easily see, and whereby we assume that the circuit is a purely inductive one. However, inasmuch as any electric circuit has a certain ohmic resistance which produces a potential drop which must be overcome by the impressed E. M. F. E, the curve F or I will be somewhat distorted and follow the line F' or I' whose ordinates are slightly smaller than those of F. What really takes place is, that the E. M. F. of self-induction is also distorted into curve $E_s'$ for the first wave, on account of the ohmic resistance, and into $E_s''$ for the second wave, the ordinates of the former being slightly smaller, those of the latter being slightly larger than those of $E_s$. This is due to the fact that the rate of change of the current and hence of the flux, or in other words, the value $\frac{dI}{dt}$, is slightly larger for the second wave than it is for the first one, which accounts for the fact that the current through D has the same direction during both pulsations, attaining, however, shortly before the end of the second pulsation zero value and assuming then a negative value as indicated. This fact (namely current I assuming a small negative value as indicated) is of advantage as it will destroy any residual magnetism in the core which might hold fast the striking member or hammer and delay it in its return to the off position.

The curves in Figure 3 have been plotted with relation to a circuit of constant self-induction, for instance a choke-coil. In an electromagnetic striking tool, however, the coefficient of self-induction changes, due to the motion of the striking member causing the air gap to vary. In such case the curves F and I for flux and current may assume shapes as illustrated in Figure 4, the exact performance, of course, depending on the design of the tool.

Figure 5:
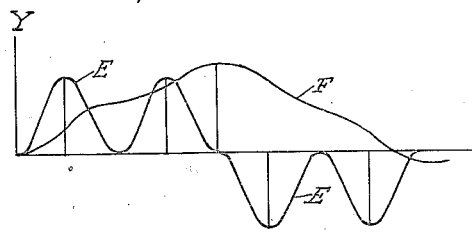
Figure 6:
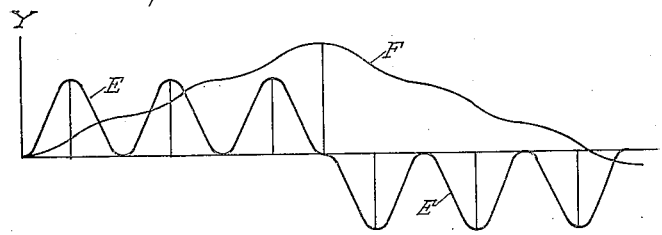

Now, instead of applying only two pulsations to the tool successively in opposite directions, we may apply two consecutive pulsations in one direction and then the next two consecutive pulsations in the opposite direction as shown in Figure 5, or we may apply three consecutive pulsations in one direction and the next three consecutive pulsations in the opposite direction as Figure 6 indicates. The number of consecutive pulsations in one or the other direction depends entirely upon the relative speeds between the armature and the reverser and the lengths of the latter's segments and the angular distance between the brushes cooperating therewith, whose detail features will be described presently. The flux curves F will in those cases have the shape as shown, and evidently the time for the working stroke of the tool is hereby doubled and tripled respectively for the same speed of the generator G. We see, however, that in every case mentioned, the flux, after the end of the second group of pulsations has been reduced again to zero or about zero, so that the striking member is now free to return to its "off" position. The application of various groups of pulsations as well as admitting the proper time for the return of the striking member is accomplished by the reverser. How this is accomplished will be explained now with reference to Figures 7 to 10.

In Figure 7 is illustrated an arrangement for the operation of a vibrator V, consisting of two coils a and b, a movable plunger e, of magnetic material, all enclosed in cylinder d having covers f and f'; both coils are separated by a wall of magnetic material g; d, f and f' are also made preferably of magnetic material. Generator G is here a four pole generator with two main brushes B and B' of the same polarity and a slip ring S, the latter being connected to the commutator by a connector c as explained above with reference to Figure 1. The reverser R positively driven by the armature shaft of the generator at a suitable speed relatively thereto, consists of two parts K and L, each of which is provided with two ring segments M, N and O, P respectively. The ring segments are connected with main brush B and brush A of slip ring S by means of brushes M', N', O' and P' respectively as shown. On the circumference of each pair of segments are disposed, at 90 degrees apart, stationary brushes T, U and X, W respectively which direct the current from the reverser to the two vibrator coils which impart the reciprocating motion to the plunger. Both parts K and L of reverser R are mounted and fixed on the same shaft 110 as shown diagrammatically, all four segments being insulated from each other and from the shaft as shown for instance in Figures 11 and 13. The shaft is driven from the armature shaft of the generator by any positive means such as gears, chains or the like at exactly half the speed of the generator armature in the present case of a four pole machine. The manner in which a gear drive may be arranged is for instance shown in Figure 15 to be described later on.

Furthermore, the timing should be such that at least one brush on each pair of segments is located right over or nearly over the center of one of the gaps separating the segments from each other, when connector $c$ is directly under the brush B. The detail construction of the brushes and segments will be made clear from the further description.

The armature of generator G, which is assumed to be a multipolar machine, will be best equipped with a two circuit winding (series winding not shown) in order to obtain electrically a better balanced armature. Of course, all main brushes may be mounted and connected up in the usual way; for the operation of the tool only one main brush is necessary but it is best to employ all brushes of the same polarity as shown in Figures 7 to 10 and in Figures 20 to 23. This will give the best practical results.

The semi-diagrammatic illustration in Figure 7 furthermore shows the relative position of all the parts for the moment when the working coil is just being connected into the circuit and ready to be energized by the first pulsation, the position being identical with that marked by the line O Y with reference to Figure 3. The same is true of Figures 8, 9 and 10.

Assuming now the direction of rotation of G and R as marked by the arrows, brush T will just come into contact with segment M, while brush U still remains resting on segment N. Coil $a$ thus receives the first pulsation which will end after connector $c$ has arrived exactly under the opposite brush B' of the same polarity and brushes T and U have arrived right over the segment gaps Q" and Q' respectively, that is after half a revolution of the generator shaft and one quarter revolution of the reverser shaft. Positions 1, 2 and 3, marked on the generator armature correspond exactly with similarly marked positions of the two pole armature in Figure 1.

As soon as gaps Q' and Q" have passed the brushes, brush T comes in contact with segment N, while brush U comes in contact with segment M, which means that now the connections to coil $a$ are reversed, in other words that the E. M. F. is now applied in the opposite direction. This will last during the next half revolution of the armature, that is until connector $c$ has again arrived in its original position under brush B, and gap Q" has arrived under brush U. Coil $a$ will thus build up the magnetic field during the first pulsation which moves the plunger of the vibrator, shown in Figure 7, to the right, and during the second pulsation the field will gradually disappear in the manner shown in Figure 3. During all this time coil $b$ remains inactive, both brushes X and W to which it is connected, resting on segment P which short-circuits the coil $b$, thus opposing any magnetism trying to enter it. The magnetic flux set up by coil $a$ will therefore take its way through wall $g$ and cover $f$, only a very small part going through the center of coil $b$ and cover $f'$ back to frame $d$.

In following up the occurrences further, we find that now conditions become exactly reversed, as can be readily seen. Coil $b$ will now be energized in a similar way as coil $a$ was before, while coil $a$ is now dead or rather short-circuited in itself by segment N, all of which again takes half a revolution of the reverser and a whole revolution of the generator armature. After this, matters are again reversed and so on, obtaining for each complete revolution of the four pole generator armature one blow of the vibrator. Assuming a generator speed of 3600 R. P. M. we will have 3600 blows per minute in the vibrator, a figure which is very suitable for this class of apparatus.

Figure 8 shows a reverser for the operation of a solenoid hammer H, the blow being effected by one coil $a$ and the return stroke by a spring 112. In this arrangement it is practicable to allow for the return stroke a greater time interval than for the working stroke. For, if the time intervals would be alike, the same or almost the same amount of energy would have to be applied for the return stroke, which energy, however, cannot be utilized and only results in an undesirable kick against the hand of the operator. A larger time interval for the return stroke requires only a comparatively light spring and consequently entails only a small energy loss.

The time allowance for the return stroke may, for instance, be twice that for the working stroke. The reverser consists here of only one pair of segments M and N, M covering $\frac{1}{3}$ and N covering $\frac{2}{3}$ of the circumference. Brushes T and U are spaced 60 degrees apart, and with regard to their mounting as to timing the same is true as what was said with reference to Figure 7. The generator speed may again be 3600 R. P. M., the speed of the reverser shaft is ⅓ of it, that is 1200 R. P. M. We can see then at a glance that during the first ⅓ revolution of the reverser R the coil a of tool H will be excited by two consecutive opposite pulsations according to the diagram Figure 3 and during this time cause the blow to be performed, while for the next two thirds of a revolution of R, coil a is short-circuited upon itself by brushes T and U and segment N, during which time the plunger is returned by spring 112. For one complete revolution of R we thus have one blow of the hammer, amounting to 1200 blows per minute, which frequency has been found very practical for a tool of this kind.

Figure 9 shows an arrangement for the same striking frequency, however, the return of the plunger being obtained by a second coil b operated by a second part L of the reverser, coil a being controlled from portion K. The relative speeds of the generator and the reverser R, of course, are 3:1 the same as in the modification shown in Figure 8. The arrangement of the reverser R is similar to that of Figure 7. However, while segment M of part K extends again over ⅓ of the circumference, exactly as in Figure 8, segment O of part L extends now over ⅔ of the circumference on account of the assumed requirement of twice the time for return stroke (M and O were of equal length in Figure 7 because of the same time allowance for both strokes). During operation of this form of tool, coil a, after one third revolution of reverser R (that is after one full revolution of G) has been excited by a pulsating E. M. F. in one direction and then by the next pulsations in the opposite direction for the working stroke (as it was in Figure 8 and according to the diagram Figure 3) during which time coil b is short-circuited by brushes X and W and segment P. During the next two thirds revolutions of R, coil a is short-circuited by brushes T and U and segment N, while coil b is now energized, however, in this case by two consecutive pulsations in one and then by the next two consecutive pulsations in the opposite direction because brush W remains in contact with segment O during one whole revolution of generator G and brush X thereafter remains in contact with segment O during the next whole revolution of the generator. This corresponds with the curve diagram Figure 5.

In Figure 10 is shown a modification of reverser R (of a form similar to that in Figure 8) allowing for the return stroke a time interval three times as long as that for the working stroke and operating, say, a hammer H with spring actuated return stroke of the kind illustrated in Figure 8. Here segment M is only ¼ of the circumference and the speed of the reverser is ¼ of that of generator G. We can see that for the same speed of 3600 R. P. M. for the generator we will obtain here 900 blows per minute in the tool, a value quite suitable for larger hammers.

In Figures 7, 8 and 10 the speed ratio of generator to reverser is 2:1, 3:1 and 4:1 respectively according to 3600, 1200 and 900 blows in the respective tools.

If we used a 6 pole generator, we obtain three pulsations per revolution instead of two and for the same generator speed of 3600 R. P. M. and the same time ratios of working-to return stroke of Figures 7, 8 and 10 we would obtain now a speed ratio of 1⅓:1, 2:1 and 2⅔:1, that is 2700, 1800 and 1350 R. P. M. for the reverser according to 5400, 1800 and 1350 blows per minute in the respective tools, assuming the reversers to be constructed for a similar time ratio of working-to return stroke. In fact, the reversers would be identically the same as for the four pole generator—so long as the time ratio of working-to return stroke is the same—they would only run with different speed, as can be clearly seen. This is of advantage in manufacturing these apparatus, because it means simplicity in standardizing.

This flexibility of my novel system can be further increased by using more than one pair of pulsations for the working stroke. For instance, if we use two pairs of pulsations for the working stroke—according to Figure 5, and again 3600 R. P. M. for the generator and also the same time ratios of the strokes as were used in Figures 7, 8 and 10, we will obtain for a four pole generator the speed ratios of 4:1, 6:1 and 8:1, that is 900, 600 and 450 R. P. M. respectively for the reverser and 1800, 600 and 450 blows per minute in the respective tools; for a six pole generator we obtain the speed ratios 2⅔:1, 4:1 and 5⅓:1, that is 1350, 900 and 675 R. P. M. for the reverser and 2700, 900 and 675 blows per minute in the respective tools.

Figures 11 to 14 illustrate a practical design of the reversers which are diagrammatically shown in Figures 7 and 8. Figures 11 and 13 are longitudinal sections and Figures 12 and 14 are developed views with the positions of the brushes marked according to Figures 7 and 8 as will be readily understood. The several segments, as shown in Figures 11 and 13 are insulated from each other and from their shaft 110 by insulating material 113. The terminals of the coils may be reversed at the brushes to which they are attached without sparking, although at this time of reversal, the maximum or nearly maximum exciting current flows over the brushes to the tool. The operation can be rendered sparkless because the size of the segments and of the segment gaps as well as the thickness (in circumferential direction) of the brushes on the commutator and on the reverser can be easily designed so, that the reverser brushes always start to cover the new segment after the commutator bar connected with slip ring S has come at least partly under the main brush, and that the reverser brushes leave the previous segment before said commutator bar leaves the main brush. Hence, during theis period there is no voltage at all between the segments of the reverser and no interruption of the circuit either, the circuit is simply short-circuited in itself by the brushes and the segments. Sparking is therefore entirely absent, and I have found by experiment that also the operation with two and even three consecutive pulsations—as illustrated in Figures 5 and 6 is perfectly satisfactory and the arrangement is very useful for practical purposes.

Of course there are other modifications possible of the manner in which E. M. F. pulsations and their resulting fluxes may be employed for the present purpose. For instance, instead of using for the working stroke one pair of pulsations consecutively applied in opposite direction to produce one flux curve F as shown for instance in Figure 3, I may use two, three or more of such pairs in succession, to produce two or more flux curves, i. e. two or more magnetic impulses for a single working stroke. Figures 29 and 30 show two of such pairs and Figure 31 shows three pairs of pulsations. Assuming for instance a spring returned hammer H as shown in Figure 8, such tool would thus receive for its power stroke two or three magnetic energy impulses instead of one as shown in Figure 3. The reciprocating element of the tool would in such cases be best one of heavy weight, with a comparatively light spring, thus allowing a comparatively long time for returning the element to the off position. The element, being of heavy weight, will be accelerated by the first flux curve F (Figures 29, 31) to a certain speed which will take the hammer only through part of its stroke. When the first flux curve becomes zero, the light spring, owing to the momentum which the hammer has attained, is not able to return it at once to the off position, but the hammer tends to progress further on its down-stroke. In the meantime the second flux curve F rises and further accelerates the hammer through another part of the stroke, and then the third curve F (Figure 31) further accelerates it through the rest of the stroke at which the blow is imparted. After the last magnetic impulse has become zero, the reverser short-circuits the coil of the hammer similar to the manner described before and now the spring returns the hammer to the off position. Instead of directing the pulsations which form the pairs, in alternating fashion, such as is shown in Figures 29 and 31, they may also be arranged as shown in Figure 30, which would produce flux curves F alternating above and below the zero line. This would not make any difference however in the operation of the tool such as described.

The directing of the E. M. F.'s, so that a single flux curve F is produced (Figures 3, 5, 6), or so that several flux curves are produced within one stroke (Figures 29, 30, 31) is merely a matter of design of the reverser, of which a number of examples have been illustrated and described. Of course the weight of the reciprocating element and the power of the spring (if such is used) must be designed in accordance therewith.

Moreover, obviously combinations allowing other working frequencies than those above described may be easily obtained without departing from the spirit and scope of my invention by simply modifying the design of the reverser or its speed or both.

Furthermore, any number of different striking frequencies may be obtained from the same generator by simply arranging for as many different reversers as are desired, according to the kind of tools to be used. Figures 15 and 16 for instance show an arrangement with three different reversers, R′, R″, R‴ all assembled on the same axle 117 and independently rotatable thereon. The entire group of reversers may be mounted together with the generator G on the same base 122 as shown. To each reverser is fastened a gear 114, 115, 116 respectively, forming together with its reverser one independent unit. These gears mesh with gears 118, 119, 120 respectively fastened on an extension 121 of the armature shaft, whereby a positive drive of the reversers at relatively different speeds is secured. On the base 122 are mounted the brush holder supports 123 (of which only one is shown in Figure 15, partly broken away) provided with lugs 124 for the brushholder studs, one support being preferably employed for each reverser. Such a support is illustrated in Figures 18 and 19, and the arrangement of the brushes may be seen from Figure 17.

It will appear from Figures 8 and 10 and from their description that, since the spacing of the reverser brushes which control the exciting of coil $a$ for the working stroke, must be equal to the circumferential distance between the segment gaps and since the total circumference is always a multiple of this spacing, instead of one pair of brushes, I may use as many brushes as can be placed on the circumference at that spacing, in other words, I obtain that many individual circuits branching out from one reverser, all brushes being symmetrically located around the circumference as indicated for instance in Figures 20 and 21 where six and eight circuits respectively could be arranged. Only three and four circuits respectively are shown here in order not to crowd the drawings. The advantage of such multiple circuit arrangements is, that the current of the generator armature is more uniformly distributed in its windings, thus effecting a more even and uniform heating besides avoiding overloading of the main brushes on the commutator and thus assuring perfect operation. Of course, the same applies to cases where a double reverser is used, as in Figures 7 and 9. Here again I may arrange as many brushes as the circumference has spaces equal to the shortest circumferential distance between the segment gaps of one unit of the double reverser. In Figures 22 and 23 the diagrams of Figures 7 and 9 respectively are reproduced, showing, however, only two circuits in order not to crowd the drawings. Of course, it is self-evident that I may connect to the same circuit as many tools in parallel as considerations of load will allow. For instance, Figures 20 to 23 show a number of tools in parallel.

Furthermore it will be readily understood that I also may connect reversers between the slip ring and the brushes of both polarities, and still more I may use any number of slip rings on the generator as can be conveniently arranged and use as many of the circuits at the same time as desired. This can only be of advantage, as it means still more uniformity in the load of the generator armature. Figure 24, for instance, illustrates a system in which the generator is provided with three slip rings S', S'', S''', the reverser circuits being connected between the main brushes of both polarities and the several slip rings. It will also be clear that in tools having two exciting coils (V and H', Figures 7 and 9) it is not necessary that both coils $a$ and $b$ be excited from the same main brush and the same slip ring as is shown in the respective figures, this is shown here only for clearness.

The generator—instead by a belt—may be operated directly from any direct current line of suitable voltage as shown in Figure 24, or it may be operated directly from an alternating current line, single, two or three phase for instance, provided the generator is equipped with the necessary number of slip rings connected to the armature winding in the right way. In these cases the generator would operate as a rotary converter, running as direct current motor or as synchronous alternating current motor, depending upon the kind of current supplied.

For instance in Figure 24$^c$ is shown diagrammatically a three phase alternating current converter G supplied from a three phase alternating current supply line, which is connected to slip rings $S^1$, $S^2$, $S^3$ through brushes 1', 2', 3'. One pole of the reversers R is connected to one of the brushes $B^1$, $B^2$ of the direct current side of the converter, while the other pole of the reversers is connected to one of the slip rings $S^1$, $S^2$, $S^3$ by means of brushes 1, 2 or 3. Merely for convenience of illustration, two sets of slip ring brushes 1, 2, 3 and $1^1$, $2^1$, $3^1$ are shown in the diagram so as to show the wiring in as simple a form as possible. It is obvious, of course, that the alternating current supply line wires may be directly connected to the brushes 1, 2 and 3. Any number of reversers R may be supplied in the manner illustrated, which is similar to the manner shown in the figures previously described, for instance in Figure 24.

In order to avoid two great fluctuations of the generator field and heating of the pole shoes, due to the fluctuating armature current, the pole shoes may be provided with a squirrel cage winding which might extend over as much of the arc of the shoes or as far beyond as desired. In Figures 24$^a$, 24$^b$, I have shown this winding extending over the arc of the pole shoes. It consists of insulated conductors 130 embedded in the poles and connected at both ends by a common conducting ring segment 131 in squirrel cage fashion. In case the generator is operated from an alternating current system, two or three phase for instance, the squirrel cage winding will also assist materially in starting the machine from the alternating current side, its action being similar to that of squirrel cage windings in plain synchronous motors.

In the following, I will now describe as an example the design of a striking tool, which may be used as a chipping, calking or riveting hammer, or as a percussion drill. The tool consists of a housing 1 and a cover 2, preferably of non-magnetic material in order to prevent magnetic leakage. Aluminum or compounds thereof would be best, as this lessens the weight of the tool at the same time. Inside the housing is located a coil 3 wound on a suitable insulating spool 4. Coil 3 is surrounded by yoke 5, consisting of iron or steel sheet stampings, riveted together by rivets 6, and forming part of the magnetic circuit. Inside spool 4 is located a core 7, here of circular cross-section, and provided with several longitudinal slots 8 to reduce the eddy currents, core 7 being made of steel or iron. The lower end 9 of the core passes through a hole in yoke 5 and through a hole in the boss 10 provided at the lower part of housing 1. The core projects beyond boss 10 and is threaded at its end as shown at 11. Core 7 rests with its shoulder 12 against yoke 5 and draws the yoke tightly against shoulder 13 of the housing when nut 14 is tightened against boss 10, thus holding yoke and coil firmly in place. Spool 4 rests with its lower flange 15 against the yoke 5, and against lugs 16 and 17 provided on the housing, and at its upper flange 18 it is steadied and held down by lugs 19 provided on cover 2. It may also be prevented from turning by set screws 20 and 21 (Figure 26) threaded through the upper part of the yoke. This arrangement secures a perfectly rigid mounting of the coil. Through the hollow center of core 7 is inserted the tool proper 22, which protrudes with its upper end a trifle beyond the surface 23 of core 7, the amount of this projection being adjustable by nuts 24 and 25 on the opposite end of core 7. As will be observed in Figure 25, tool 22 rests with a shoulder 26 against nut 25, whereby it is always held in the right position. Through the inner opening 27 of spool 4 swings the striking member or hammer 28 which is pivotally mounted by means of two extensions 29 and 30 integral with hammer 28 (see Figures 27, 28), and two pivots 31, 32, fitting with their inner ends into corresponding recesses of extensions 29 and 30 and being threaded at 33 and 34 respectively into portion 35 of housing 1 which at this point extends outwardly from its cylindrical shape to make room for the pivots. Hammer 28 is held in the off position by helical springs 36 and 37 mounted on extensions 29 and 30. The inner ends 38 and 39 of these springs are fastened to hammer 28, the outer ends 40 and 41 enter holes in washers 42 and 43 respectively which can be tightened against lugs 44 and 45 of the housing by nuts 46 and 47 mounted on threaded parts 48 and 49 of pivots 31 and 32. Nuts 46 and 47 are provided with means for tightening, for instance small holes 50 arranged around the circumference into which a pin may be inserted. These details are more fully shown in Figure 28. Hammer 28 thus can be easily adjusted so that it comes exactly in the middle between the cheeks 51 and 52 of the yoke (Figure 27) in order to avoid an uneven attraction or magnetic pull from them and thus to avoid binding. The pivots may be provided with small oilers 53 of the spring and ball type and with short wicks 54, through which the oil may, through a small hole 55 in the pivot, reach, a wick 56 resting against the end of the pivot by which the bearing surfaces are always kept well lubricated. The oil may thus be fed to the pivots with the spout of an ordinary oil can, without opening the tool.

On the striking face of hammer 28 is inserted a hardened steel plug 57; also the face 58 of tool 22 is preferably hardened to insure longer service. The stroke of hammer 28 is limited by a stop 59 integral with or otherwise suitably fastened to cover 2 which is attached to housing 1 for instance by screws 60. Cover 2 is provided with a suitably shaped handle 62, inside of which may be pivotally mounted by a pin 63 a lever 64 projecting through a slot 65 of the handle, and which lever, by means of a link 66 may operate the switch contacts 67 and 68 of switch 69, preferably located in an extension 70 of the handle. The switch is sealed against the outside by a cap 71 provided with an insulating bushing 72 through which the supply wires enter the tool.

Instead of or in addition to screws 20 and 21 which hold the yoke and spool together at their upper ends, there may be provided screws 73, 74, 75 and 76 threaded into the housing and bearing against the yoke 5 to hold it rigidly in place and to prevent it from vibration during the working of the tool.

I have shown for instance in Figures 5 and 6, and referred to hereinbefore the use of even numbers of pulsations for the purpose described. It is not necessary to use an even number of pulsations in order to produce the desired pulsating field. For instance as shown in Figures 32–34 the number of pulsations may be uneven.

Figure 32 shows three pulsations, the first two build up the field and the third removes it. All that is necessary in this case is to give the third pulsation a greater amplitude so as to remove the field within the time interval of one pulsation.

Figure 33 shows five pulsations, three for building up the field and two pulsations of greater amplitude for removing the field.

Figure 34 shows how the field may be repeatedly built up by a number of pulsations of the same amplitude and then be removed by one pulsation of larger amplitude.

The pulsations of larger amplitude may be furnished by a second armature winding located on the same armature and the reverser is properly designed to make the desired connections at the proper time.

I have described hereinbefore and illustrated various ways of producing pulsating uni-directional E. M. F.'s, for instance by means of a direct current generator plain and simple or also by means of rotary converters or the like. Also, for the purpose of controlling the supply of these E. M. F.'s to the reciprocating mechanism and of properly directing the polarity of its operating coil or coils I have shown and described a preferred type of reverser which I propose to employ. In the annexed claims, I wish it to be understood that the term "direct current generator," used therein for convenience of expression, includes the forms of simple direct current generators, as well as converters or their equivalents, capable of generating pulsating direct current or more precisely, pulsating uni-directional E. M. F.'s of the character herein described.

The term "reverser" where used in the claims includes all such means capable of supplying in timed relation these E. M. F.'s to the reciprocating mechanism and of directing the polarity of its operating coil or coils as required, the broad idea underlying my invention comprising the utilization of pulsating uni-directional E. M. F.'s for this purpose, their intermittent supply to the tool during time intervals approximately or exactly equal to the period of a plurality of said pulsations, and the directing of the polarity of the operating coil or coils of the mechanism so that the magnetic field used for operating the tool is built up and removed within said time interval.

I claim:

1. Means for operating an electromagnetic reciprocating mechanism comprising a direct current generator, a circuit adapted to carry a pulsating uni-directional electromotive force and being connected to one of the generator brushes and to any suitable point of the generator armature winding, means connected in said circuit and suitably connected to said reciprocating mechanism, for intermittently supplying current to said mechanism during time intervals substantially equal to the period of a plurality of said electro-motive force pulsations and for directing the current supplied to said mechanism so as to repeatedly cause a building up and removal of a magnetic field in said mechanism within each of said time intervals.

2. Means for operating an electromagnetic reciprocating mechanism comprising a direct current generator, a circuit adapted to carry a pulsating uni-directional electromotive force and being connected to one of the generator brushes and to any suitable point of the generator armature winding, means positively operated by said generator and connected in said circuit and suitably connected to said reciprocating mechanism, for intermittently supplying current to said mechanism during time intervals substantially equal to the period of a plurality of said electromotive force pulsations and for directing the current supplied to said mechanism so as to repeatedly cause a building up and removal of a magnetic field in said mechanism within each of said time intervals.

3. Means for operating an electromagnetic reciprocating mechanism comprising a direct current generator, a circuit adapted to carry a pulsating uni-directional electromotive force and being connected to one of the generator brushes and to any suitable point of the generator armature winding, a reverser having slip rings and ring segments suitably spaced circumferentially, said reverser being positively operated by said generator and having its slip rings connected into said circuit and having said segments connected to said reciprocating mechanism for intermittently supplying current to said mechanism during time intervals substantially equal to the period of a plurality of said electromotive force pulsations and for directing the current supplied to said mechanism so as to repeatedly cause a building up and removal of a magnetic field in said mechanism within each of said time intervals.

4. Means for operating an electromagnetic reciprocating mechanism comprising a direct current generator, a supply circuit adapted to carry a pulsating uni-directional electro-motive force and being connected to one of the generator brushes and to any suitable point of the generator armature winding, a reverser connected in said circuit and suitably operated, and having means for connecting said mechanism to said supply circuit when the electro-motive force in said circuit is substantially zero, and for maintaining said connection during a time interval substantially equal to the period of a plurality of said electro-motive force pulsations, and for disconnecting said mechanism during a time interval equal to the period of at least one of said pulsations, said reverser also having means for directing the current supplied to said mechanism so that the magnetic field of said mechanism is built up and removed within said time interval of connection.

5. Means for operating an electromagnetic reciprocating mechanism comprising a direct current generator, a supply circuit adapted to carry a pulsating uni-directional electro-motive force and being connected to one of the generator brushes and to any suitable point of the generator armature winding, a reverser connected in said circuit and suitably operated, having means for connecting said mechanism to said supply circuit when the electro-motive force in said circuit is substantially zero, and for maintaining said connection during a time interval substantially equal to the period of a plurality of said electro-motive force pulsations, and for disconnecting said mechanism during a time interval equal to the period of at least one of said pulsations, said reverser also having means for directing the current supplied to said mechanism so as to repeatedly cause the building up and removal of the magnetic field of said mechanism within each of said time intervals of connection.

6. Means for operating an electromagnetic reciprocating mechanism comprising a direct current generator, a supply circuit adapted to carry a pulsating uni-directional electro-motive force and being connected to one of the generator brushes and to any suitable point of the generator armature winding, a reverser having two slip rings connected in said circuit and slip ring segments one connected to each slip ring, both segments being arranged in one radial plane but having different circumferential lengths, the length of the smaller segment being equal to that fraction of the circumference which passes a given point during the time period of at least one of said electro-motive force pulsations, the larger segment occupying substantially the remainder of the circumference, brushes sliding on said segmental rings and spaced apart the length of said smaller segment, a field coil in said reciprocating mechanism connected to the brushes so spaced, said ring segments intermittently supplying current to said coil during time intervals substantially equal to the period of a plurality of said pulsations, and adapted to direct the current supplied to said field coil to first cause the building up of a magnetic field in said mechanism and to then cause the removal of said field within said time interval of current supply and means for positively operating said reverser in definite time relation to the armature speed of said generator.

7. Means for operating an electromagnetic reciprocating mechanism comprising a direct current generator, a supply circuit adapted to carry a pulsating uni-directional electro-motive force and being connected to one of the generator brushes and to any suitable point of the armature winding, a reverser having two slip rings connected in said circuit and slip ring segments one connected to each slip ring, both segments being arranged in one radial plane but having different circumferential lengths, the length of the smaller segment being equal to that fraction of the circumference which passes a given point during the time period of at least one of said electro-motive force pulsations, the larger segment occupying substantially the remainder of the circumference, brushes sliding on said segmental rings and spaced apart the length of said smaller segment, a field coil in said reciprocating mechanism connected to the brushes so spaced, said ring segments intermittently supplying current to said coil during time intervals substantially equal to the period of a plurality of said pulsations, and adapted to direct the current supplied to said field coil to repeatedly cause a building up and removal of a magnetic field in said mechanism within each of said time intervals of current supply and means for positively operating said reverser in definite time relation to the armature speed of said generator,

HENRY POTH.